US012253809B2

(12) United States Patent
Kawajiri

(10) Patent No.: US 12,253,809 B2
(45) Date of Patent: Mar. 18, 2025

(54) IMAGE-FORMING APPARATUS APPARATUS INCLUDING A CHARGING ROLLER TO CHARGE A SURFACE OF AN IMAGE CARRIER

(71) Applicant: SHARP KABUSHIKI KAISHA, Sakai (JP)

(72) Inventor: Kazuki Kawajiri, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 18/372,345

(22) Filed: Sep. 25, 2023

(65) Prior Publication Data

US 2024/0103394 A1 Mar. 28, 2024

(30) Foreign Application Priority Data

Sep. 26, 2022 (JP) ................................ 2022-152689

(51) Int. Cl.
*G03G 15/00* (2006.01)
*G03G 15/02* (2006.01)
*G03G 21/20* (2006.01)

(52) U.S. Cl.
CPC ..... *G03G 15/0258* (2013.01); *G03G 15/0266* (2013.01); *G03G 21/20* (2013.01)

(58) Field of Classification Search
USPC ........................................................ 399/44
See application file for complete search history.

(56) References Cited

U.S. PATENT DOCUMENTS 6,047,145 A 4/2000 Shigezaki et al.
2013/0058679 A1* 3/2013 Shono ................ G03G 15/0225 399/100

FOREIGN PATENT DOCUMENTS

JP H10171213 A 6/1998

* cited by examiner

*Primary Examiner* — Quana Grainger
(74) *Attorney, Agent, or Firm* — ScienBiziP, P.C.

(57) ABSTRACT

An image-forming apparatus includes a photosensitive drum on which a toner image is formed and a charging roller that is brought into contact with a surface of the photosensitive drum to charge the surface of the photosensitive drum. The photosensitive drum is rotatable in both a forward rotation direction and a reverse rotation direction which are rotation directions in image formation, and the charging roller is rotatable in accordance with rotation of the photosensitive drum. The image-forming apparatus executes a preliminary charging operation of applying a DC voltage to the charging roller and then rotating the photosensitive drum in at least one of the forward rotation direction and the reverse rotation direction so that a pre-rotation contact portion that is in contact with the charging roller before the rotation on the surface of the photosensitive drum is charged when being moved to discharge regions on the charging roller.

7 Claims, 8 Drawing Sheets

FIG. 9

| STANDING ENVIRONMENT | STANDING TIME AFTER PRECEDING DRIVING STOP(h) | | | |
|---|---|---|---|---|
| | 0~12 | 12~24 | 24~72 | 72 OR MORE |
| LOW TEMPERATURE (℃) (0~15) | 0 | 0 | 0.5 | 1 |
| ROOM TEMPERATURE (℃) (15~28) | 0 | 0.5 | 1 | 2 |
| HIGH TEMPERATURE (℃) (28 OR MORE) | 0.5 | 1 | 2 | 3 |

FIG. 10

| STANDING ENVIRONMENT | STANDING TIME AFTER PRECEDING DRIVING STOP(h) | | | |
|---|---|---|---|---|
| | 0~12 | 12~24 | 24~72 | 72 OR MORE |
| LOW TEMPERATURE (℃) (0~15) | 0 SEC | 0 SEC | 0 SEC | 0 SEC |
| ROOM TEMPERATURE (℃) (15~28) | 0 SEC | 0 SEC | 0 SEC | 0 SEC |
| HIGH TEMPERATURE (℃) (28 OR MORE) | 0 SEC | 0 SEC | 0 SEC | 0.3 SEC |

| STANDING ENVIRONMENT | NUMBER OF ROTATIONS (TIMES) DURING 24 HOURS BEFORE PRECEDING DRIVING STOP | | | |
|---|---|---|---|---|
| | 0~500 | 500~2000 | 2000~5000 | 5000 OR MORE |
| LOW TEMPERATURE (℃) (0~15) | 0 | 0.5 | 0.8 | 1 |
| ROOM TEMPERATURE (℃) (15~28) | 0.5 | 0.8 | 1 | 1.2 |
| HIGH TEMPERATURE (℃) (28 OR MORE) | 1 | 1 | 1.2 | 1.5 |

IMAGE-FORMING APPARATUS APPARATUS INCLUDING A CHARGING ROLLER TO CHARGE A SURFACE OF AN IMAGE CARRIER

BACKGROUND OF THE INVENTION

Field of the Invention

The present disclosure relates to an image-forming apparatus, such as a photocopier, a multifunction peripheral, a printer, or a facsimile machine, including a charging device that charges an image carrier.

Description of the Background Art

Charging devices including a charging roller that comes into contact with an image carrier to charge a surface of the image carrier have been used in order to form a toner image on the surface of the image carrier (photoreceptor). In the image-forming apparatuses including such a charging device, the image carrier and the charging roller are in contact with each other so as to apply pressure to each other. Here, the charging roller is formed by, for example, coating a conductive core material with a conductive rubber layer and forming a protective layer on the conductive rubber layer. Such a charging roller has a function of uniformly charging the image carrier by coming into contact with the image carrier at a predetermined pressure.

Here, when an image-forming apparatus that has not performed an image forming operation for a relatively long period of time is driven, unexpected black streaks may be generated in an image formed on a sheet or the like. Since a position of the generation of the black streaks corresponds to a portion of the image carrier which has been in contact with the charging roller for a long period of time, it is presumed that the generation of the black streaks is caused by the image carrier and the charging roller being in contact with each other at a predetermined pressure for a long period of time. Specifically, when the charging roller is brought into contact with the image carrier at the predetermined pressure, low-molecular components in the conductive rubber layer of the charging roller exude to an outside of the protective layer, and adhesion between the image carrier and the charging roller increases due to plastic deformation of a surface layer or the like. Accordingly, charge exchange or the like occurs between the image carrier and the charging roller when the image carrier and the charging roller are separated from each other, and therefore, it is presumed that the generation of the black streaks is caused by non-uniformity of the charging on the surface of the image carrier or the like.

In order to solve a problem that image quality is deteriorated due to generation of black streaks in an image formed on a sheet or the like, image-forming apparatuses which include a photoreceptor and a charging roller (charging roll) and control operation of the charging roller so as to apply a DC voltage having the same polarity as a charging polarity of the photoreceptor to the photoreceptor at the same time as or earlier than start of rotation of the photoreceptor have been used.

According to such an image-forming apparatus, by applying a DC voltage to the photoreceptor at the same time as or earlier than start of rotation of the photoreceptor, it is possible to eliminate non-uniformity of charging at a portion where the photoreceptor and the charging roller have been in contact with each other at a predetermined pressure for a long period of time and to uniformly charge a surface of the photoreceptor. Therefore, the problem that black streaks are generated in an image formed on a sheet or the like may be solved.

However, in the above-described image-forming apparatus, at a portion where the photoreceptor and the charging roller are in contact with each other, the non-uniformity of the charging can be eliminated, but there is a possibility that a period of time required for applying the DC voltage becomes relatively long. In particular, in the above-described image-forming apparatus, when an image forming operation is performed in a case where the image-forming apparatus is not driven for a long period of time, the image forming operation may not be promptly performed, and a waiting time for image formation becomes long. Furthermore, in a case where the image forming operation is promptly performed, the non-uniformity of the charging is not completely eliminated, and accordingly, there is a possibility that black streaks are generated in an image formed on a sheet or the like.

the charging roller have been in contact with each other at a predetermined pressure for a long period of time and to uniformly charge a surface of the photoreceptor. Therefore, the problem that black streaks are generated in an image formed on a sheet or the like may be solved.

The present disclosure provides an image-forming apparatus capable of promptly forming an image and suppressing deterioration in image quality even when the image-forming apparatus is driven after the image-forming apparatus is not driven for a long period of time.

SUMMARY OF THE INVENTION

According to an aspect of the present disclosure, an image-forming apparatus includes an image carrier on which a toner image is formed, and a charging roller that is brought into contact with a surface of the image carrier to charge the surface of the image carrier. The image carrier is rotatable in both a forward rotation direction and a reverse rotation direction which are rotation directions in image formation, and the charging roller is rotatable in accordance with rotation of the image carrier. A preliminary charging operation is performed which is an operation of applying a DC voltage to the charging roller and then rotating the image carrier in at least one of the forward rotation direction and the reverse rotation direction so that a pre-rotation contact portion that is in contact with the charging roller before the rotation on the surface of the image carrier is charged when being moved to discharge regions on the charging roller.

Accordingly, since the image-forming apparatus executes the preliminary charging operation before executing the image forming operation, it is possible to eliminate the non-uniformity of the charging of the surface of the image carrier and to suppress deterioration of image quality of an image formed on a sheet. For example, generation of black streaks or the like caused by a fact that the image forming operation is not performed for a long period of time may be suppressed when an image is formed on a sheet or the like. Furthermore, since the preliminary charging operation may be executed in a relatively short period of time before the image forming operation is executed, the efficiency of the image formation is not lowered. That is, deterioration in image quality may be suppressed without deteriorating the working efficiency of the image-forming apparatus.

Furthermore, in the image-forming apparatus described above, when a predetermined period of time has elapsed since a preceding image forming operation and a predetermined environmental condition is satisfied at a time of acceptance of execution of an image forming operation, the preliminary charging operation may be performed before the accepted image forming operation is performed. In the preliminary charging operation, in a state in which the DC voltage is applied to the charging roller, the image carrier may be rotated in the reverse rotation direction to move the pre-rotation contact portion into the discharge regions, and thereafter, rotated in the forward rotation direction, before the rotation and the application of the DC voltage are stopped.

In the image-forming apparatus described above, the discharge regions are adjacent spaces which are located adjacent to a nip region, in which the charging roller is in contact with the image carrier, in the forward rotation direction and the reverse rotation direction, and have a gap between the charging roller and the image carrier within a predetermined distance.

In the image-forming apparatus described above, in the preliminary charging operation, a rotation angle of the image carrier in the forward rotation direction after the rotation in the reverse rotation direction may be larger than a rotation angle of the image carrier in the reverse rotation direction.

In the image-forming apparatus described above, an image quality adjustment operation may be started to attain a predetermined image quality after the preliminary charging operation is terminated, and the image forming operation may be started after the image quality adjustment operation is terminated.

In the image-forming apparatus described above, a rotation speed at which the image carrier is rotated in the forward rotation direction and the reverse rotation direction in the preliminary charging operation may be lower than a rotation speed at which the image carrier is rotated in the image forming operation.

The image-forming apparatus described above may further include at least one of a timer that measures an elapsed time from an end of a preceding image forming operation, a temperature detector that detects a temperature, and a rotation detector that measures the number of rotations of the image carrier in a period a predetermined period of time before an end of the preceding image forming operation. Execution and duration of the preliminary charging operation may be determined in accordance with a value output from at least one of the timer, the temperature detector, and the rotation detector.

The image-forming apparatus described above may further include at least one of a timer that measures an elapsed time from an end of a preceding image forming operation, a temperature detector that detects a temperature, and a rotation detector that measures the number of rotations of the image carrier in a period a predetermined period of time before an end of the preceding image forming operation. Execution and duration of the preliminary charging operation may be determined in accordance with a value output from at least one of the timer, the temperature detector, and the rotation detector, and the image quality adjustment operation is executed after the preliminary charging operation is executed.

The present disclosure may provide an image-forming apparatus capable of promptly forming an image and suppressing deterioration in image quality even when the image-forming apparatus is driven after the image-forming apparatus is not driven for a long period of time.

BRIEF DESCRIPTION OF THE DRAWINGS

FIG. 9 is a table of data affected by a driving state of the photosensitive drum when the preliminary charging operation is to be performed by the image-forming apparatus according to the embodiment of the present disclosure.

FIG. 10 is a table of data affected by a driving state of the photosensitive drum when an idling operation is performed by the image-forming apparatus according to the embodiment of the present disclosure.

DESCRIPTION OF THE PREFERRED EMBODIMENTS

Figure 1:
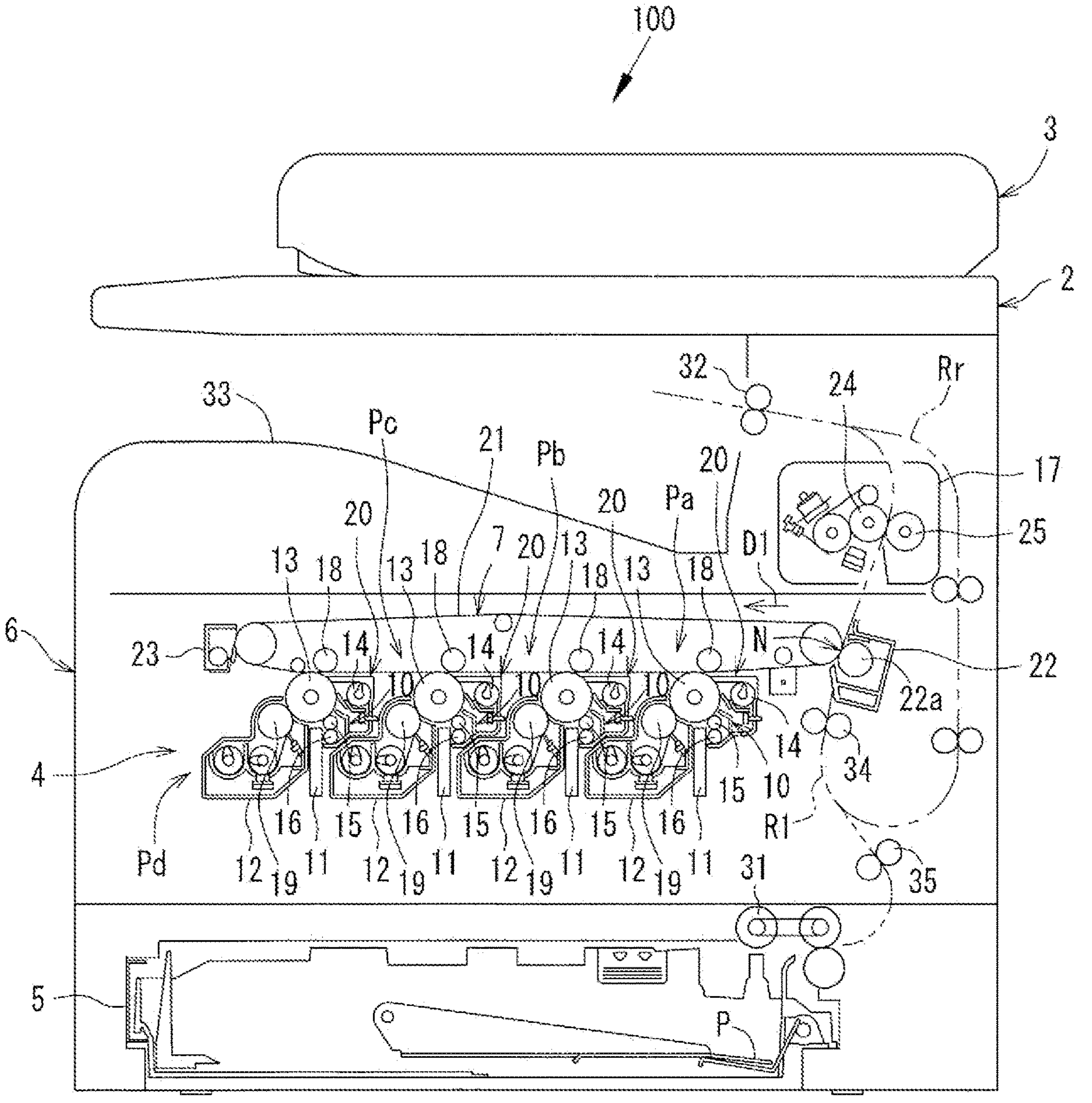
FIG. 1 is a cross-sectional view schematically illustrating a configuration of an image-forming apparatus according to an embodiment.

An embodiment of the present disclosure will be described hereinafter with reference to the accompanying drawings. In the following description, the same components are designated by the same reference numerals. The same components have the same names and the same functions. Therefore, detailed description thereof will not be repeated.

Figure 2:
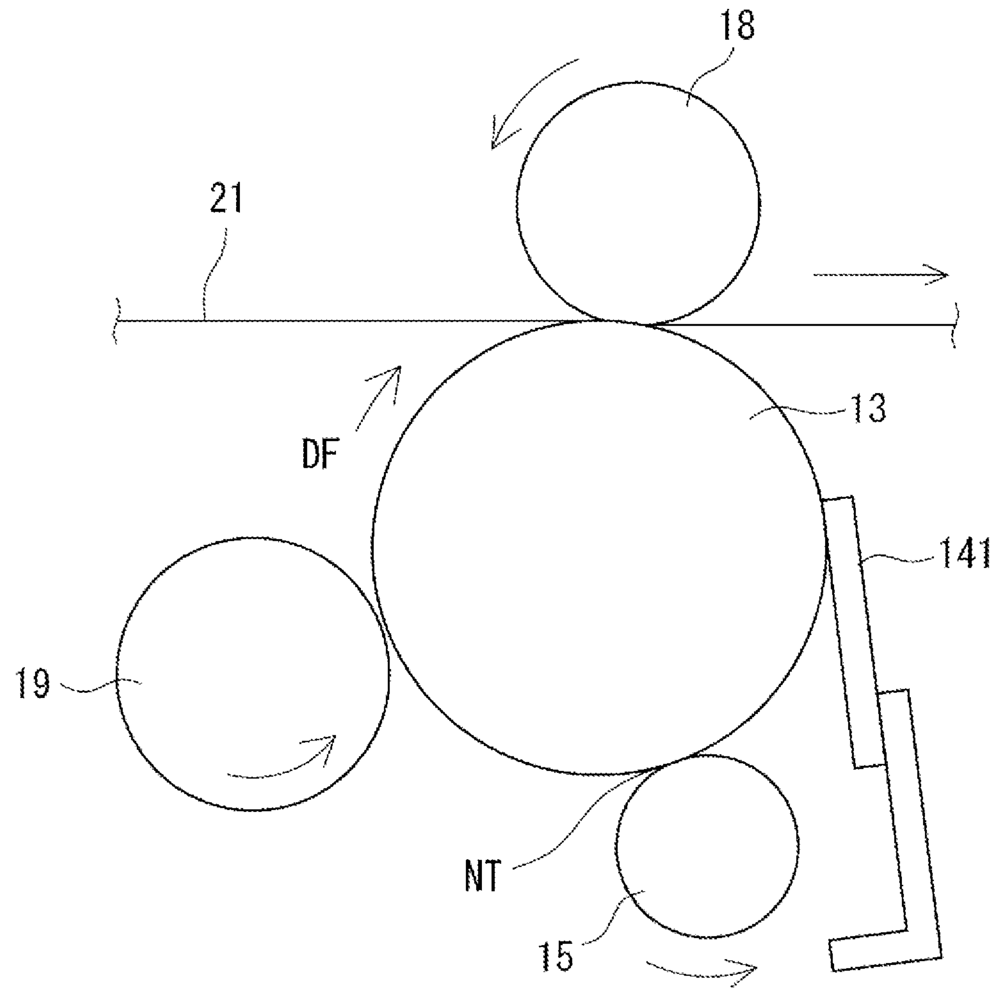
FIG. 2 is a cross-sectional view schematically illustrating a configuration of a portion in the vicinity of a photosensitive drum included in the image-forming apparatus according to the embodiment.

FIG. 1 is a cross-sectional view of an image-forming apparatus including a charging device according to the embodiment. FIG. 2 is a cross-sectional view schematically illustrating a configuration of a portion in the vicinity of a photosensitive drum included in the image-forming apparatus according to the embodiment.

As illustrated in FIG. 1, an image-forming apparatus 100 has a copying function of reading a document and printing the document on a recording sheet P. The image-forming apparatus 100 includes an image reader 2, a document conveyer 3, an image former 4, a sheet feeding cassette 5, a primary transfer device 7, a secondary transfer device 22, a belt cleaner 23, and a fixing device 17. The image former 4 and the sheet feeding cassette 5 are disposed in an image-forming apparatus main body 6. The image reader 2 and the document conveyer 3 are mounted on an upper portion of the image-forming apparatus main body 6.

The image-forming apparatus 100 handles image data corresponding to a color image using black (K), cyan (C), magenta (M), and yellow (Y), or image data corresponding to a monochrome image using a single color (e.g., black). The image former 4 includes four charging devices 10, four exposure devices 11, four developing devices 12, four photosensitive drums 13 serving as image carriers, and four photosensitive cleaners 14 corresponding to black, cyan, magenta, and yellow, and forms four types of toner image corresponding to the respective colors. The charging devices 10, the corresponding exposure devices 11, the corresponding developing devices 12, the corresponding photosensitive drums 13, and the corresponding photosensitive cleaners 14 constitute four corresponding image stations Pa, Pb, Pc, and Pd.

The charging devices 10 charges surfaces of the corresponding photosensitive drums 13. Each of the charging devices 10 includes a charging roller 15 that comes into contact with a surface of a corresponding one of the photosensitive drums 13 to charge the surface of the photosensitive drum 13, and a cleaning roller 16 that cleans the surface of the charging roller 15. The charging roller 15 includes a metal shaft serving as a rotation shaft and a conductive elastic member formed to have a predetermined thickness on an outer side of the metal shaft. As illustrated in FIG. 2, the charging roller 15 is disposed so as to abut on the surface of the photosensitive drum 13 at a predetermined pressure by a biasing member (not illustrated), and a charging nip region NT is formed between the charging roller 15 and the photosensitive drum 13. The photosensitive drum 13 may be rotationally driven not only in a forward rotation direction DF but also in a reverse rotation direction DR (refer to FIG. 6) by a driving source 50 (refer to FIG. 4) included in the image former 4. Here, the forward rotation direction DF is a rotation direction of the photosensitive drum 13 during image formation, and the reverse rotation direction DR is a direction opposite to the rotation direction of the photosensitive drum 13 during image formation, that is, a rotation direction opposite to the forward rotation direction DF. As the photosensitive drum 13 is rotationally driven in the forward rotation direction DF and the reverse rotation direction DR, the charging roller 15 is rotated by a frictional force generated in the charging nip region NT so as to move together with (follow) the rotation of the photosensitive drum 13 in the forward rotation direction DF and the reverse rotation direction DR. In other words, the charging roller 15 is rotatable in accordance with the rotation of the photosensitive drum 13. Note that arrows illustrated in FIG. 2 indicate directions of rotations and the like of the components in a state where the photosensitive drum 13 is rotating in the forward rotation direction DF, and are driving directions in the image forming operation.

The exposure device 11 is, for example, an LED, and exposes the surface of the photosensitive drum 13 uniformly charged by the charging device 10 in accordance with image data to form an electrostatic latent image corresponding to the image data on the surface of the photosensitive drum 13.

The developing device 12 has a developing roller 19 disposed so as to face the photosensitive drum 13. The developing roller 19 carries a developer accommodated in a developing tank, and an electrostatic latent image formed on the surface of the photosensitive drum 13 by the exposure device 11 is developed using the developer, so that a toner image is formed on the surface of the photosensitive drum 13. In this way, a toner image is formed on the photosensitive drum 13.

The primary transfer device 7 includes an intermediate transfer belt 21 and an intermediate transfer roller 18. Note that four intermediate transfer rollers 18 are disposed inside the intermediate transfer belt 21 so as to form four types of toner image corresponding to the image stations Pa, Pb, Pc, and Pd.

The intermediate transfer belt 21 rotationally moves in an arrow direction D1. In the primary transfer device 7, the intermediate transfer roller 18 sequentially performs primary transfer of the toner images of the individual colors formed on the surfaces of the photosensitive drums 13 by the developing devices 12 onto the intermediate transfer belt 21 to superimpose the toner images, thereby forming a color toner image on the intermediate transfer belt 21.

The photosensitive cleaner 14 includes a cleaning blade 141 (refer to FIG. 2) serving as a cleaning member. The photosensitive cleaner 14 collects transfer residual toner remaining on the photosensitive drum 13 without being transferred to the intermediate transfer belt 21 by the primary transfer device 7 as waste toner by the cleaning blade 141, and conveys the collected toner toward a toner collection container (not illustrated). Here, when the cleaning blade 141 comes into contact with the photosensitive drum 13 and the photosensitive drum 13 rotates in the forward rotation direction, the cleaning blade 141 scrapes off the transfer residual toner remaining on the photosensitive drum 13. Therefore, while the photosensitive drum 13 rotates in the forward rotation direction, a force is applied so that the cleaning blade 141 is bent. However, when the photosensitive drum 13 rotates in the reverse rotation direction DR, the cleaning blade 141 is not subjected to a force that causes the cleaning blade 141 to bend, and the cleaning blade 141 returns to its original shape, thereby eliminating a load on the cleaning blade 141.

A nip region N is formed between the intermediate transfer belt 21 and a transfer roller 22*a* of the secondary transfer device 22, and a recording sheet P conveyed through an S-shaped sheet conveyance path R1 is nipped and conveyed in the nip region N.

The secondary transfer device 22 performs secondary transfer, to the recording sheet P, of the toner image that is obtained by the primary transfer to the intermediate transfer belt 21. In this example, the secondary transfer device 22 includes the transfer roller 22*a*. The transfer roller 22*a* electrostatically transfers the toner image transferred to the intermediate transfer belt 21 by the primary transfer device 7 to the recording sheet P to form an unfixed toner image on the recording sheet P.

The belt cleaner 23 collects, as waste toner, transfer residual toner remaining on the intermediate transfer belt 21 without being transferred to the recording sheet P by the secondary transfer device 22, and conveys the waste toner to the toner collection container.

The fixing device 17 applies heat and pressure to the recording sheet P to which an unfixed toner image has been transferred while the recording sheet P is nipped and conveyed between the heating roller 24 and the pressure roller 25, thereby thermally fixing the unfixed toner image to the recording sheet P.

On the other hand, the recording sheet P is drawn out of the sheet feeding cassette 5 by a pickup roller 31, conveyed through the sheet conveyance path R1, and discharged onto a discharge tray 33 through discharge rollers 32 after passing through the secondary transfer device 22 and the fixing device 17. Registration rollers 34 and conveyance rollers 35 are disposed in the sheet conveyance path R1. The registration rollers 34 are temporarily stop the recording sheet P, align a leading edge of the recording sheet P, and then start conveyance of the recording sheet P in time for the transfer of the toner image in the nip region N between the intermediate transfer belt 21 and the transfer roller 22*a*.

The conveyance rollers 35 promotes conveyance of the recording sheet P.

Furthermore, when an image is formed (printed) not only on a front side but also on a back side of the recording sheet P, the recording sheet P is conveyed in a reverse direction from the discharge rollers 32 to a reverse path Rr so that the recording sheet P is reversed, is guided to the registration rollers 34 again, and is discharged to the discharge tray 33 via the nip region N and the fixing device 17 in the same manner as the front side of the recording sheet P.

Figure 3:
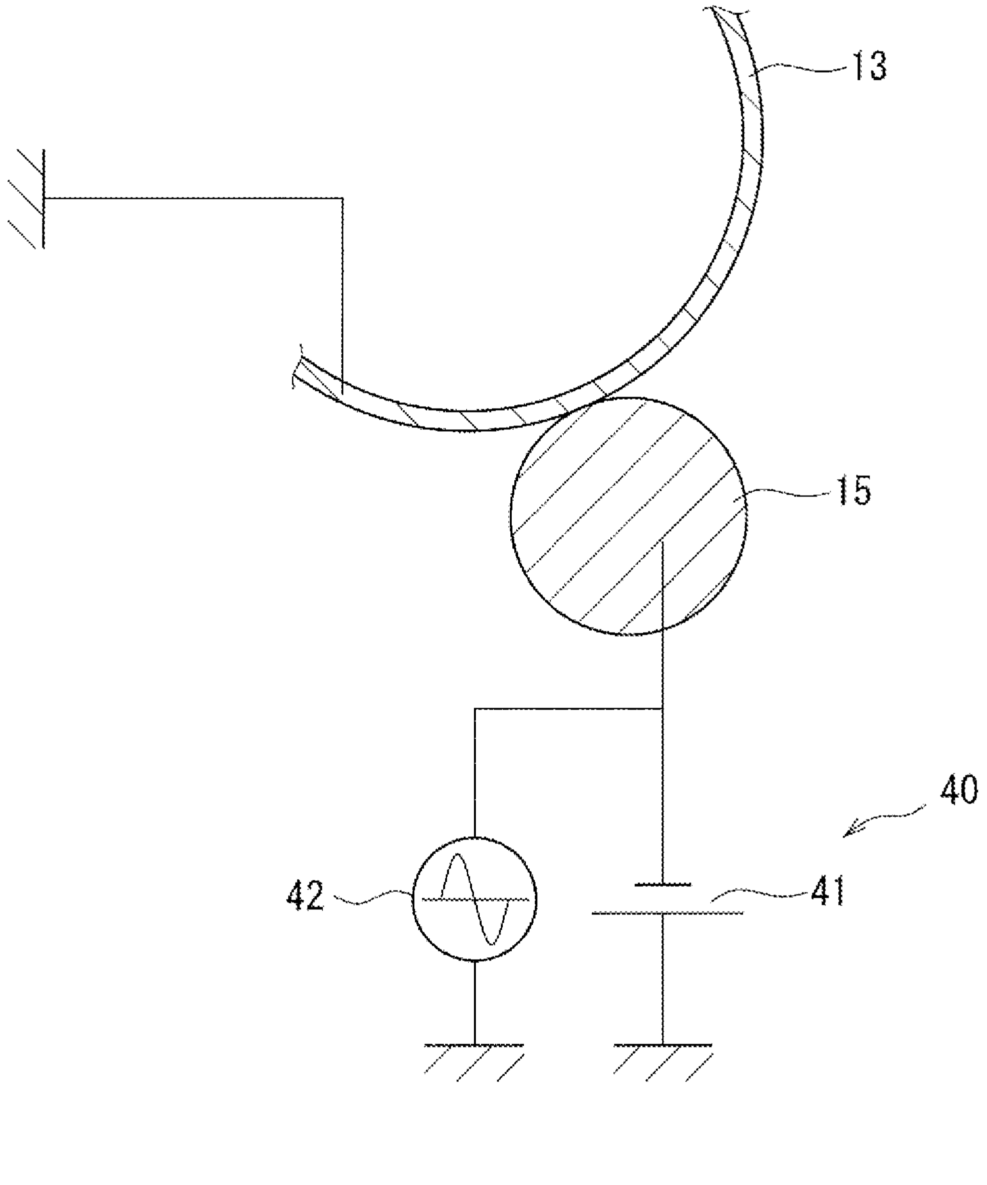
FIG. 3 is a cross-sectional view schematically illustrating a configuration for charging a surface of the photosensitive drum by a charging roller included in the image-forming apparatus according to the embodiment.

Here, a configuration for uniformly charging the surface of the photosensitive drum 13 by the charging roller 15 of the charging device 10 will be described with reference to the drawings. FIG. 3 is a cross-sectional view schematically illustrating a configuration for charging the surface of the photosensitive drum 13 by the charging roller 15 in the image-forming apparatus 100 according to this embodiment.

As illustrated in FIG. 3, the photosensitive drum 13 is grounded, and a bias power supply 40 disposed on the charging device 10 is connected to the charging roller 15 disposed so as to be in contact with the photosensitive drum 13. The bias power supply 40 includes a DC power supply 41 that applies a DC voltage to the charging roller 15 and an AC power supply 42 that applies an AC voltage to the charging roller 15. The bias power supply 40 can independently apply each of the DC voltage and the AC voltage to the charging roller 15, or can apply the DC voltage and the AC voltage to the charging roller 15 in a superimposed manner. In the charging roller 15, a type, a voltage value, and the like of a voltage to be applied are determined by a controller 180 to be described later, before the voltage is applied.

Figure 4:
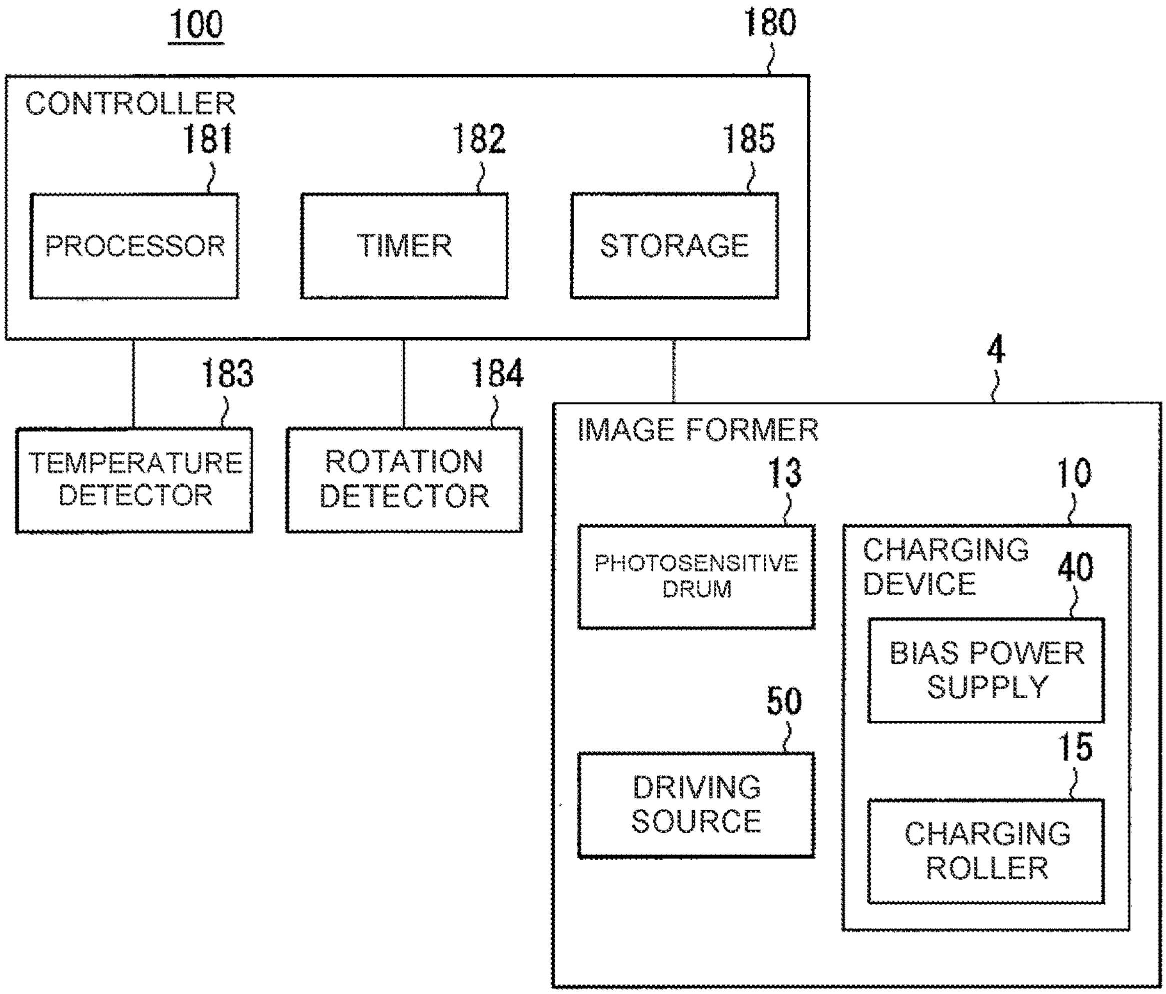
FIG. 4 is a block diagram schematically illustrating a configuration for controlling a rotation operation of the charging roller included in the image-forming apparatus according to the embodiment of the present disclosure.

Next, a configuration for controlling a rotation operation of the charging roller 15 of the charging device 10 in the image-forming apparatus 100 will be described with reference to the drawings. FIG. 4 is a block diagram schematically illustrating the configuration for controlling the rotation operation of the charging roller 15 included in the image-forming apparatus 100 according to the embodiment of the present disclosure.

As illustrated in FIG. 4, the image-forming apparatus 100 includes the controller 180, a temperature detector 183, and a rotation detector 184 in addition to the above-described configuration.

The temperature detector 183 is a temperature sensor that is disposed on the image-forming apparatus 100 and detects a temperature around the image-forming apparatus 100. Detected temperature data is transmitted to the controller 180. Furthermore, the rotation detector 184 is a sensor that measures (monitors) a rotation state of the photosensitive drum 13. For example, the rotation detector 184 detects data relating to the rotation state, such as the number of rotations of the photosensitive drum 13 within a predetermined period of time or whether the photosensitive drum 13 is rotating. The data detected by the rotation detector 184 is transmitted to the controller 180. Note that, as will be described in detail later, the rotation detector 184 can calculate the number of rotations of the photosensitive drum 13 within 24 hours before the end of a preceding image forming operation (a stop of rotational driving of the photosensitive drum 13).

The controller 180 includes a processor 181 constituted by a microcomputer, such as a central processing unit (CPU), a timer 182 for counting time, a read only memory (ROM), a random access memory (RAM), and a storage 185 including a storage device, such as a data-rewritable non-volatile memory.

Furthermore, the processor 181 loads a control program stored in the ROM of the storage 185 in advance onto the RAM of the storage 185 and executes the control program to perform operation control of the various components. For example, when an operation is performed on the image-forming apparatus 100 to copy a document, an instruction indicating that the operation has been performed is transmitted to the controller 180, and the processor 181 instructs the document conveyer 3, the image reader 2, the image former 4, and the like to perform a document conveying operation, a reading operation, an image forming operation, and the like. Then these operations are performed to form an image on the recording sheet P.

Furthermore, the ROM of the storage 185 also stores data and the like to be used for controlling individual operations performed by the image-forming apparatus 100. The processor 181 performs calculation and the like based on the data and the like received from the individual components to determine operations, and transmits instructions to the individual components to perform the determined operations.

The image-forming apparatus 100 according to this embodiment determines and controls operations of the charging device 10 (the charging roller 15) and the like particularly based on data supplied from the temperature detector 183, the rotation detector 184, and the like. Specifically, according to the image-forming apparatus 100, when a predetermined condition is satisfied, for example, when an image forming operation is not performed for a long period of time or when a predetermined environmental condition is satisfied, a preliminary charging operation for uniformly charging the surface of the photosensitive drum 13 is performed before the image forming operation. As a result, non-uniformity of charging at a portion where the photosensitive drum 13 and the charging roller 15 are kept in contact with each other for a long period of time is eliminated by the preliminary charging operation. Thereafter, the image forming operation including an operation of forming an electrostatic latent image on the surface of the photosensitive drum 13 or the like is performed, and thus it is possible to suppress deterioration in quality of an image formed on the recording sheet P.

Figure 5:
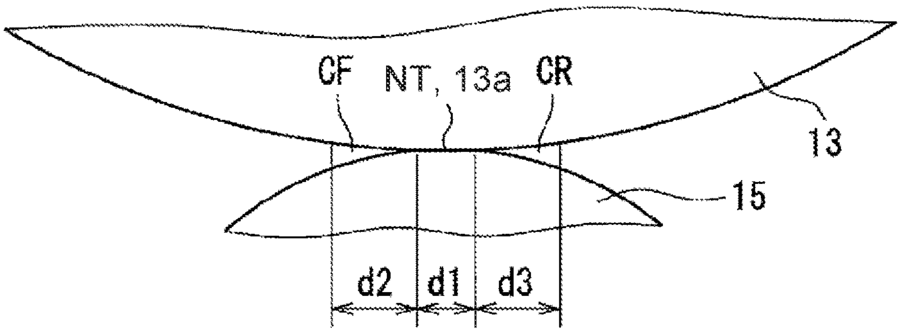
FIG. 5 is an enlarged cross-sectional view schematically illustrating a portion in the vicinity of a nip region between the photosensitive drum and the charging roller for explaining a preliminary charging operation performed by the image-forming apparatus according to the embodiment of the present disclosure.
Figure 6:
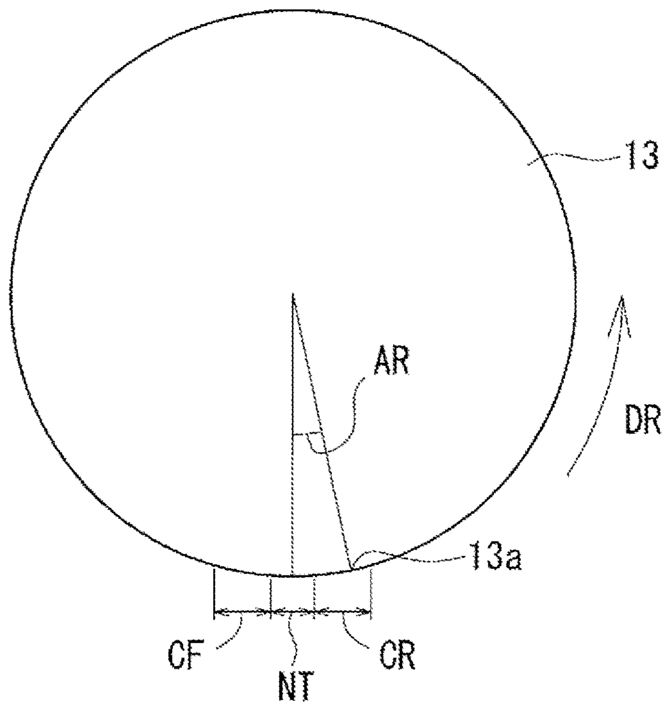
FIG. 6 is an enlarged cross-sectional view schematically illustrating the photosensitive drum rotating in a reverse rotation direction in the preliminary charging operation performed by the image-forming apparatus according to the embodiment of the present disclosure.
Figure 7:
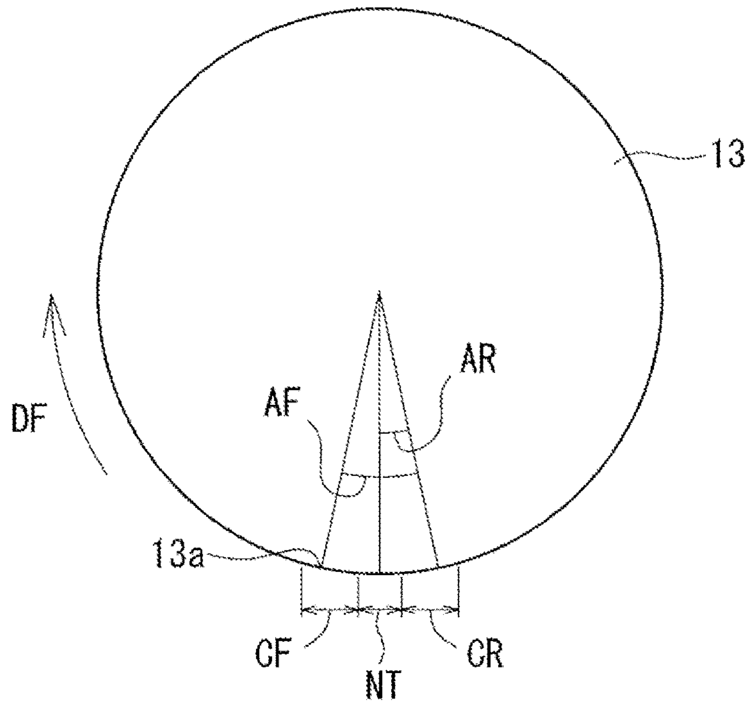
FIG. 7 is an enlarged cross-sectional view schematically illustrating the photosensitive drum rotating in a forward rotation direction in the preliminary charging operation performed by the image-forming apparatus according to the embodiment of the present disclosure.

Here, an outline of the preliminary charging operation will be described with reference to the drawings. FIG. 5 is an enlarged cross-sectional view schematically illustrating a portion in the vicinity of the nip region NT between the photosensitive drum 13 and the charging roller 15 for explaining the preliminary charging operation performed by the image-forming apparatus 100 according to the embodiment of the present disclosure. FIG. 6 is an enlarged cross-sectional view schematically illustrating the photosensitive drum 13 rotating in the reverse rotation direction DR in the preliminary charging operation performed by the image-forming apparatus 100 according to the embodiment of the present disclosure. FIG. 7 is an enlarged cross-sectional view schematically illustrating the photosensitive drum 13 rotating in the forward rotation direction in the preliminary charging operation performed by the image-forming apparatus 100 according to the embodiment of the present disclosure.

The preliminary charging operation is an operation for uniformly charging the surface of the photosensitive drum 13 when the image forming operation is performed. In particular, in a case where the image forming operation is not performed for a long period of time, the charging roller 15 and the photosensitive drum 13 are continuously in contact with each other at the same position, which may cause a problem. Specifically, in a case where the image forming operation is not performed for a long period of time, non-uniformity of charging may occur in a pre-rotation contact portion 13*a* which is in contact with the charging roller 15 for a long period of time in the nip region NT of the photosensitive drum 13. Therefore, when the image forming operation is executed as it is, in an image formed on the recording sheet P, black streaks may be generated in a portion corresponding to the pre-rotation contact portion 13*a* and the image quality may be deteriorated. However, according to the image-forming apparatus 100, by executing the preliminary charging operation, uniformity of the charging of the surface of the photosensitive drum 13 is attained and deterioration in image quality is suppressed.

Here, as illustrated in FIG. 5, the charging roller 15 is in contact with the photosensitive drum 13 so that the nip region NT is formed. A length d1 in the nip region NT in a circumferential direction of the photosensitive drum 13 is, for example, approximately 1 mm or less. Here, when a voltage is applied to the charging roller 15 by at least one of the DC power supply 41 and the AC power supply 42, electric discharge occurs from the charging roller 15 toward a portion between the charging roller 15 and the photosensitive drum 13 in a discharge region CF and a discharge region CR which are gap regions formed adjacent to the nip region NT. By this discharge, portions of (the surface of) the photosensitive drum 13 corresponding to the discharge region CF and the discharge region CR are charged. The discharge region CF and the discharge region CR are proximity spaces that are adjacent to the nip region NT, in which the charging roller 15 is in contact with the photosensitive drum 13, in the forward rotation direction DF and the reverse rotation direction DR, respectively, and have a gap between the charging roller 15 and the photosensitive drum 13 within a predetermined distance. In the discharge regions CR and CF, when a bias voltage is applied to the charging roller 15, dielectric breakdown occurs due to a potential difference between the charging roller 15 and the photosensitive drum 13, and discharge occurs. This discharge can be stably generated like a glow discharge by appropriately setting a resistance value of the charging roller 15. In other words, a bias voltage that causes discharge in the discharge region CF and the discharge region CR is applied to the charging roller 15. Note that the charging roller 15 and the photosensitive drum 13 are not in contact with each other on sides of the discharge regions CF and CR opposite to the nip region NT, and gaps between the charging roller 15 and the photosensitive drum 13 is approximately 0.5 mm. In other words, the region where the dielectric breakdown occurs and the discharge occurs is a minute region of a gap between the charging roller 15 and the photosensitive drum 13 of approximately 0.5 mm or less, and a value of the gap where the dielectric breakdown occurs changes depending on materials and environments of the photosensitive drum 13 and the charging roller 15.

Note that, although the nip region NT is not directly charged because the charging roller 15 and the photosensitive drum 13 are in contact with each other and no discharge occurs in the nip region NT, the nip region NT is charged when electrons generated by the discharge in the discharge region CF and the discharge region CR move through an charge transport layer (CTL) provided on a surface layer of the photosensitive drum 13. However, in order to sufficiently charge the nip region NT of the photosensitive drum 13, it takes time for the electrons to move through the charge transport layer (CTL), and therefore, it takes a longer time as compared with the charging by the discharge in the discharge region CF and the discharge region CR.

For example, when a voltage of 600 V (−600 V) is applied to the charging roller 15, charging to a predetermined potential by discharge in the discharge region CF and the discharge region CR takes approximately 0.6 seconds, whereas charging to a predetermined potential in the nip region NT takes approximately 5 seconds. Note that distances d2 and d3 of ranges of the discharge region CF and the discharge region CR, respectively are, for example, approximately equal to or less than 2 mm.

Therefore, in the preliminary charging operation, the DC voltage is applied to the charging roller 15 by the DC power supply 41 in a state in which the photosensitive drum 13 is rotated in at least one of the forward rotation direction DF and the reverse rotation direction DR and the pre-rotation contact portion 13*a* located in the nip region NT before the rotation is moved to at least one of the discharge region CF and the discharge region CR. At this time, the surface of the photosensitive drum 13 positioned in the nip region NT, that is, the pre-rotation contact portion 13*a*, is discharged and charged in one of the discharge regions CF and CR.

As described above, the image-forming apparatus 100 is capable of executing the preliminary charging operation of applying a DC voltage to the charging roller 15 and then rotating the photosensitive drum 13 in at least one of the forward rotation direction DF and the reverse rotation direction DR to move the pre-rotation contact portion 13*a* of the photosensitive drum 13, which has been in contact with the charging roller 15 before the rotation and which is positioned on the surface of the photosensitive drum 13, into the discharge regions CF and CR of the charging roller 15. With this preliminary charging operation, charging on the surface of the photosensitive drum 13 may be achieved within a short period of time. Therefore, the image forming operation may be promptly performed, and deterioration in quality of an image formed on the recording sheet P may be suppressed.

In the preliminary charging operation, specifically, before the image forming operation is performed, a DC voltage is applied to the charging roller 15 by the DC power supply 41, and in this state, as illustrated in FIG. 6, the photosensitive drum 13 starts to rotate in the reverse rotation direction DR, and stops after the rotation by a rotation angle AR. Note that, at this time, the pre-rotation contact portion 13*a* is positioned in the discharge region CR. Thereafter, the photosensitive drum 13 starts to rotate in the forward rotation direction DF, and as illustrated in FIG. 7, and stops after the rotation by a rotation angle AF. Note that, at this time, the pre-rotation contact portion 13*a* may be positioned within the discharge region CF, or may exceed the discharge region CF in the forward rotation direction DF. That is, in the preliminary charging operation, in a state in which a DC voltage is applied to the charging roller 15, the photosensitive drum 13 is rotated in the reverse rotation direction DR to move the pre-rotation contact portion 13*a* into the discharge region CR, and then is rotated in the forward rotation direction DF before the rotation of the photosensitive drum 13 and the application of the DC voltage by the DC power supply 41 are stopped. The image forming operation is performed after the preliminary charging operation. The charging roller 15 is charged to form an electrostatic latent image on the surface of the photosensitive drum 13. Specifically, a DC voltage and an AC voltage are applied to the charging roller 15 by the DC power supply 41 and the AC power supply 42, respectively, and charging for forming an electrostatic latent image on the surface of the photosensitive drum 13 is performed.

By operating as described above, the charging property of the pre-rotation contact portion 13*a* that is likely to be worse than the other regions of the photosensitive drum 13 may be improved since charging is performed in advance in the discharge region CR. As a result, non-uniformity of charging can be eliminated. Furthermore, even when charging may not be sufficiently performed in the discharge region CR, there is a chance to perform charging again in the discharge region CF on the forward rotation direction DF side with respect to the nip region NT, and therefore, the non-uniformity of charging may be reliably improved. Note that, since the pre-rotation contact portion 13*a* is charged in the discharge region CR, the pre-rotation contact portion 13*a* is charged to substantially the same potential as a charged potential of the other regions. Therefore, even when the pre-rotation contact portion 13*a* is stopped after passing through the discharge region CF, uniformity of the charging may be sufficiently ensured. That is, in the preliminary charging operation, when the rotation angle AF of the photosensitive drum 13 in the forward rotation direction DF after the rotation of the photosensitive drum 13 in the reverse rotation direction DR is set to be larger than the rotation angle AR of the photosensitive drum 13 in the reverse rotation direction DR, the uniformity can be sufficiently secured (refer to FIG. 7). When the rotation angle AR of the photosensitive drum 13 in the reverse rotation direction DR is the same as the rotation angle AF of the photosensitive drum 13 in the forward rotation direction DF after the rotation in the reverse rotation direction DR, the pre-rotation contact portion 13*a* stops again in the nip region NT. Therefore, there is no chance for charging in the discharge region CF, and accordingly, the uniformity of charging is worse than the case of passing through the discharge region CF.

After the preliminary charging operation, a so-called idling operation may be performed in which the photosensitive drum 13 is rotated in the forward rotation direction DF for a predetermined period of time in a state in which a DC voltage and an AC voltage are applied to the charging roller 15. Here, when the idling operation is performed under a specific condition in which the uniformity of charging generated in the pre-rotation contact portion 13*a* between the photosensitive drum 13 and the charging roller 15 is poor, the uniformity of charging may be further improved. The details will be described later.

Note that a rotation speed (circumferential speed) for rotating the photosensitive drum 13 in the forward rotation direction DF and the reverse rotation direction DR in the preliminary charging operation is lower than a rotation speed (circumferential speed) for rotating the photosensitive drum 13 in the image forming operation. Furthermore, a circumferential speed of the rotation of the photosensitive drum 13 in the idling operation may be equal to a circumferential speed of the rotation of the photosensitive drum 13 in the image forming operation. Specifically, the circumferential speed of the rotation of the photosensitive drum 13 in the image forming operation is, for example, 220 to 290 mm/s, and the circumferential speed of the rotation of the photosensitive drum 13 in the preliminary charging operation is, for example, 130 mm/s. In this way, the non-uniformity of the charging generated at the pre-rotation contact portion 13*a* can be improved.

Furthermore, in the preliminary charging operation, a value of the DC voltage applied to the charging roller 15 is set to 600 V (−600 V) in this embodiment, but may be changed in a range from 350 to 700 V (−350 to −700 V) according to a state of the photosensitive drum 13 or the developing device 12.

Note that the preliminary charging operation may be performed not only before the image forming operation but also before an image adjusting operation performed for attaining predetermined image quality. That is, the image-forming apparatus 100 may start the image adjusting operation in order to attain the predetermined image quality after finishing the preliminary charging operation, and start the image forming operation after finishing the image adjusting operation. In this way, stable image quality can always be attained.

Figure 8:
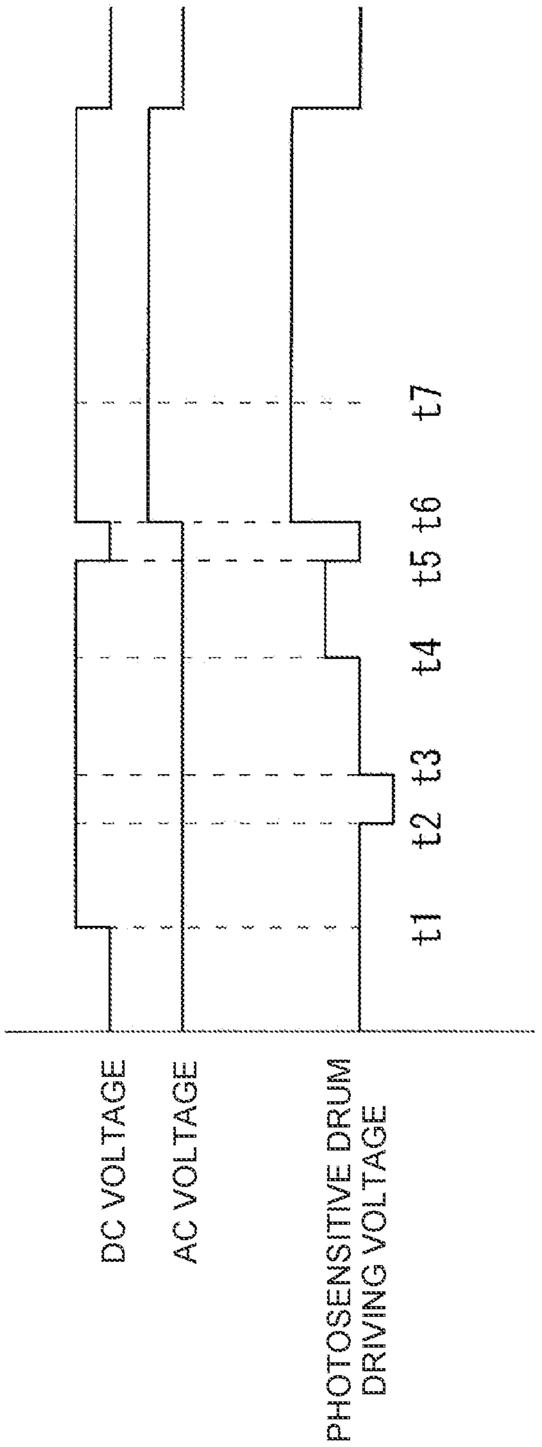
FIG. 8 is a timing chart illustrating timings of rotation of the photosensitive drum and application of a voltage to the charging roller in a case where the image-forming apparatus performs the preliminary charging operation according to the embodiment of the present disclosure.

Next, a rotational operation of the photosensitive drum 13, timings when a voltage is applied to the charging roller 15, and the like when the preliminary charging operation is performed will be described with reference to the drawings. FIG. 8 is a timing chart illustrating timings of rotation of the photosensitive drum 13 and application of a voltage to the charging roller 15 when the image-forming apparatus 100 performs the preliminary charging operation according to the embodiment of the present disclosure.

When the image-forming apparatus 100 is operated to perform the image forming operation, the processor 181 determines whether to perform the preliminary charging operation. Although details will be described later, the image-forming apparatus 100 performs the preliminary charging operation before performing an accepted image forming operation in a case where a predetermined period of time has elapsed after a preceding image forming operation and a predetermined environmental condition is satisfied at a time of the acceptance of execution of the image forming operation. Then, when the processor 181 determines that the preliminary charging operation is to be performed, the DC power supply 41 applies a DC voltage to the charging roller 15 at a time point t1 as illustrated in FIG. 8. When the DC voltage is applied (time point t1), a driving voltage of the photosensitive drum 13 is 0, and therefore, the photosensitive drum 13 is not rotationally driven and is stopped. However, at a time point t2, the photosensitive drum 13 starts to be rotationally driven in the reverse rotation direction DR. The photosensitive drum 13 stops when rotating by the rotation angle AR (time point t3). Note that, at this time, the pre-rotation contact portion 13*a* is positioned in the discharge region CR (refer to FIG. 6).

The photosensitive drum 13 stops until a time point t4, and starts to be rotationally driven in the forward rotation direction DF at the time point t4. The photosensitive drum 13 stops when rotating by the rotation angle AF (time point t5). Note that, at this time, the pre-rotation contact portion 13*a* is positioned in the discharge region CF beyond the nip region NT (refer to FIG. 7). Furthermore, at the time point t5, the application of the DC voltage to the charging roller 15 is also stopped. In a period of time from the time point t1 to the time point t5, the DC voltage is applied to the charging roller 15, and the preliminary charging operation is executed. Note that the execution time of the preliminary charging operation may be changed according to a preceding rotational driving state of the photosensitive drum 13 or the like. Furthermore, in the period of time for the preliminary charging operation, a period of time from the time point t2 to the time point t5 may be fixed, for example, 0.09 seconds. Note that, in this case, a period of time from the time point t2 to the time point t3 may be 0.01 seconds, a period of time from the time point t3 to the time point t4 may be 0.03 seconds, and a period of time from the time point t4 to the time point t5 may be 0.05 seconds. In addition, the period of time (time point t1 to time point t5) for the entire preliminary charging operation may be set to, for example, 1 second. Furthermore, this one second is used as a reference time of the entire preliminary charging operation. Note that these period of times may be set to preferable values according to a model of the image-forming apparatus 100.

The photosensitive drum 13 stops from the time point t5 to a time point t6. Furthermore, from the time point t6 to a time point t7, the photosensitive drum 13 may be rotated in the forward rotation direction DF in a state in which a DC voltage and an AC voltage are applied to the charging roller 15 by the DC power supply 41 and the AC power supply 42, respectively, as the idling operation. Note that the idling operation is performed immediately before the image forming operation.

After the time point t7, the image forming operation is performed by rotating the photosensitive drum 13 in the forward rotation direction DF in a state in which a DC voltage and an AC voltage are applied to the charging roller 15 by the DC power supply 41 and the AC power supply 42.

After the time point t6, a value of the driving voltage of the photosensitive drum 13 is larger than values (absolute values) of the driving voltages in a section from the time point t4 to the time point t5 and a section from the time point t2 to the time point t3. This is because, as described above, the circumferential speed of the rotation of the photosensitive drum 13 in the preliminary charging operation is lower than the circumferential speeds of the rotation of the photosensitive drum 13 in the image forming operation and the idling operation.

Note that, as described above, the image-forming apparatus 100 performs the preliminary charging operation before performing the image forming operation, thereby suppressing deterioration of image quality caused by a long-time contact between the photosensitive drum 13 and the charging roller 15. However, the processor 181 determines whether to perform the preliminary charging operation, the execution time of the preliminary charging operation, and the like based on conditions, such as an elapsed time from when the photosensitive drum 13 performs a preceding image forming operation (the photosensitive drum 13 is rotationally driven) to when an instruction for performing a current image forming operation is issued. The conditions and the like will be described below with reference to the drawings.

Figures 11, 12:
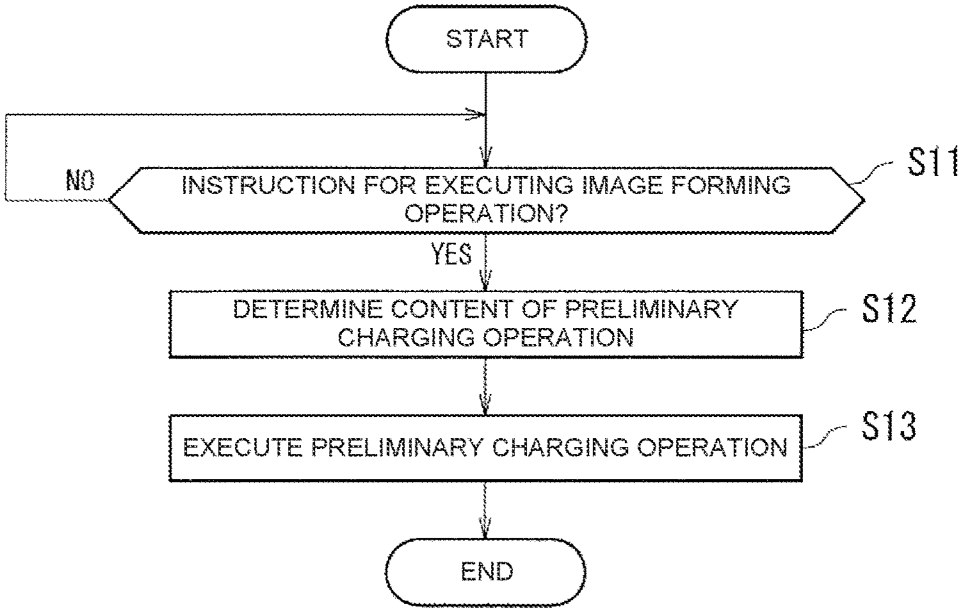
FIG. 11 is a table of data affected by the number of rotations of the photosensitive drum in the past when the preliminary charging operation is to be performed by the image-forming apparatus according to the embodiment of the present disclosure.
FIG. 12 is a flowchart illustrating an example of an operation for controlling the preliminary charging operation performed by the image-forming apparatus according to the embodiment of the present disclosure.

FIG. 9 is a table of data affected by a driving state of the photosensitive drum 13 when the preliminary charging operation is to be performed by the image-forming apparatus 100 according to the embodiment of the present disclosure. FIG. 10 is a table of data affected by a driving state of the photosensitive drum 13 when the idling operation is to be by the image-forming apparatus 100 according to the embodiment of the present disclosure. FIG. 11 is a table of data affected by the number of rotation of the photosensitive drum 13 in the past when the preliminary charging operation is to be performed by the image-forming apparatus 100 according to the embodiment of the present disclosure.

In FIG. 9, coefficients by which the reference time of the entire preliminary charging operation is multiplied in order to determine the period of time (time point t1 to time point t5) of the entire preliminary charging operation are illustrated. Specifically, the coefficients by which the reference time of the entire preliminary charging operation is multiplied are determined based on an elapsed time (standing time) after a preceding image forming operation, that is, after rotational driving of the photosensitive drum 13 is stopped, and an ambient temperature of the image-forming apparatus 100 when the image forming operation is executed. Note that, in this embodiment, the reference time of the entire preliminary charging operation is 1 second as described above.

The ambient temperature of the image-forming apparatus 100 is detected by the temperature detector 183 and is stored in the storage 185 as necessary. Furthermore, the timer 182 measures a period of time after an end of a preceding image forming operation. The processor 181 obtains a corresponding one of the coefficients illustrated in FIG. 9 based on these values and multiplies the reference time of the entire preliminary charging operation by the coefficient to calculate and determine the period of time of the entire preliminary charging operation of this time. Note that, in FIG. 9, "0 to 12", "12 to 24", "24 to 72", and "72 or more" indicate that the period of time after the end of the preceding image forming operation is "0 hours or more and less than 12 hours", "12 hours or more and less than 24 hours", "24 hours or more and less than 72 hours", and "72 hours or more", respectively. Furthermore, in FIG. 9, "0 to 15", "15 to 28", and "28 or more" indicate that the ambient temperature of the image-forming apparatus 100 when the image forming operation is executed is "0° C. or more and less than 15° C.", "15° C. or more and less than 28° C.", and "28° C. or more", respectively.

Here, for example, when the period of time after the end of the preceding image forming operation is "0 hour or more and less than 12 hours" and the ambient temperature of the image-forming apparatus 100 at the time of execution of the image forming operation is "0° C. or more and less than 15° C.", according to FIG. 9, a coefficient by which the reference time of the entire preliminary charging operation is multiplied is "0". Therefore, the processor 181 determines not to perform the preliminary charging operation.

Here, for example, when the period of time after the end of the preceding image forming operation is "12 hour or more and less than 24 hours" and the ambient temperature of the image-forming apparatus 100 at the time of execution of the image forming operation is "15° C. or more and less than 28° C.", according to FIG. 9, a coefficient by which the reference time of the entire preliminary charging operation is multiplied is "0.5". Therefore, the processor 181 multiplies 1 second which is the reference time of the entire preliminary charging operation by "0.5", so that the period of time for the entire preliminary charging operation is determined to be 0.5 seconds.

Note that the period of time for the entire preliminary charging operation is 0.5 seconds, and the period of time from the time point t2 to the time point t5 is fixed as described above to 0.09 seconds. Therefore, the period of time from the time point t1 to the time point t2 is 0.41 seconds. When the coefficients calculated in FIG. 9 are, for example, “1”, “2”, and “3”, period of times from the time t1 to the time t2 are 0.91 seconds, 1.91 seconds, and 2.91 seconds, respectively.

Note that, although details will be described later, the coefficients calculated based on FIG. 11 are also coefficients for calculating the period of times for the entire preliminary charging operation by being multiplied by the reference time of the entire preliminary charging operation. Specifically, the period of time for the entire preliminary charging operation is calculated by multiplying the reference time of the entire preliminary charging operation by both the coefficient obtained based on FIG. 9 and the coefficient obtained based on FIG. 11. Therefore, the period of time for the entire preliminary charging operation also changes according to the coefficient calculated on the basis of FIG. 11. The above description regarding FIG. 9 indicates the case where the coefficient calculated based on FIG. 11 is “1”, and the case where the coefficient calculated based on FIG. 11 is other than “1” may be different from the above description.

In FIG. 10, the period of time (time point t6 to time point t7) of the idling operation after the preliminary charging operation and before the image forming operation is illustrated. Specifically, the period of time for the idling operation is indicated based on an elapsed time (standing time) after the preceding image forming operation, that is, after the rotational driving of the photosensitive drum 13 is stopped, and an ambient temperature of the image-forming apparatus 100 when the image forming operation is executed.

As described above, the ambient temperature of the image-forming apparatus 100 when the image forming operation is performed is detected by the temperature detector 183. Furthermore, the timer 182 measures a period of time after an end of a preceding image forming operation. The processor 181 calculates and determines a period of time for the idling operation illustrated in FIG. 10 based on these values. Note that, in FIG. 10, “0 to 12”, “12 to 24”, “24 to 72”, “72 or more”, “0 to 15”, “15 to 28”, and “28 or more” are the same as those in FIG. 9.

Here, for example, when the period of time after the end of the preceding image forming operation is “72 hour or more” and the ambient temperature of the image-forming apparatus 100 at the time of execution of the image forming operation is “28° C. or more”, according to FIG. 10, the processor 181 determines that the period of time for the idling operation is 0.3 seconds. Furthermore, in cases other than this condition, the processor 181 determines that the period of time for the idling operation is 0 second and the idling operation is not executed according to FIG. 10.

In FIG. 11, as with FIG. 9, in order to determine the period of time (time point t1 to time point t5) for the entire preliminary charging operation, coefficients by which the reference time of the entire preliminary charging operation is multiplied are illustrated, and this is similar to the description with respect to FIG. 9 described above. Note that, as described above, the period of time for the entire preliminary charging operation is calculated by multiplying the reference time of the entire preliminary charging operation by both the coefficient obtained based on FIG. 9 and the coefficient obtained based on FIG. 11. A description below regarding FIG. 11 indicates a case where a coefficient calculated based on FIG. 9 is “1”, and cases where a coefficient calculated based on FIG. 9 is other than “1” may be different from the description below.

In FIG. 11, a coefficient by which the reference time of the entire preliminary charging operation is multiplied is determined based on the number of rotations of the photosensitive drum 13 and the ambient temperature of the image-forming apparatus 100 which performs the image forming operation after the preceding image forming operation, that is, during a period of 24 hours before the time when the rotational driving of the photosensitive drum 13 is stopped. Note that, in this embodiment, the reference time of the entire preliminary charging operation is 1 second as described above.

The ambient temperature of the image-forming apparatus 100 when the image forming operation is performed is detected by the temperature detector 183. Furthermore, the number of rotations which is the number of rotations of the photosensitive drum 13 during the period of 24 hours before the time when the photosensitive drum 13 is stopped after the preceding image forming operation is terminated is detected by the rotation detector 184 and stored in the storage 185. The processor 181 obtains a corresponding one of the coefficients illustrated in FIG. 11 based on these values and multiplies the reference time of the entire preliminary charging operation by the coefficient to calculate and determine the period of time for the entire preliminary charging operation of this time. Note that, in FIG. 11, “0 to 500”, “500 to 2000”, “2000 to 5000”, and “5000 or more” indicate that the number of rotations after the end of the preceding image forming operation is “0 times or more and less than 500 times”, “500 times or more and less than 2000 times”, “2000 times or more and less than 5000 times”, and “5000 times or more”, respectively. Furthermore, in FIG. 11, “0 to 15”, “15 to 28”, and “28 or more” indicate that the ambient temperature of the image-forming apparatus 100 when the image forming operation is executed is “0° C. or more and less than 15° C.”, “15° C. or more and less than 28° C.”, and “28° C. or more”, respectively.

Here, for example, when the number of rotations of the photosensitive drum 13 during the period of 24 hours before the time when the photosensitive drum 13 is stopped after the preceding image forming operation is terminated is “0 times or more and less than 500 times” and the ambient temperature of the image-forming apparatus 100 at the time of execution of the image forming operation is “0° C. or more and less than 15° C.”, according to FIG. 11, a coefficient by which the reference time of the entire preliminary charging operation is multiplied is “0”. Therefore, the processor 181 determines not to perform the preliminary charging operation.

Here, for example, when the number of rotations after the end of the preceding image forming operation is “500 times or more and less than 2000 times” and the ambient temperature of the image-forming apparatus 100 at the time of execution of the image forming operation is “15° C. or more and less than 28° C.”, according to FIG. 11, a coefficient by which the reference time of the entire preliminary charging operation is multiplied is “0.8”. Therefore, the processor 181 multiplies 1 second which is the reference time of the entire preliminary charging operation by “0.8”, so that the period of time for the entire preliminary charging operation is determined to be 0.8 seconds.

Note that the period of time for the entire preliminary charging operation is 0.8 seconds, and the period of time from the time point t2 to the time point t5 is fixed as described above to 0.09 seconds. Therefore, the period of time from the time point t1 to the time point t2 is 0.71 seconds. When the coefficients calculated according to FIG. 11 are, for example, “0.5”, “1”, “1.2”, and “1.5”, period of times from the time point t1 to the time point t2 are 0.41 seconds, 0.91 seconds, 1.11 seconds, and 1.41 seconds, respectively.

The relationships illustrated in FIGS. 9, 10, and 11 are stored in the storage 185. Based on data transmitted from the temperature detector 183, the rotation detector 184, the timer 182, the storage 185, and the like when the image forming operation is performed, the processor 181 instructs the individual components to determine operations associated with the preliminary charging operation, such as a determination as to whether the preliminary charging operation is to be performed, the configuration of the preliminary charging operation, and a determination as to whether the idling operation is to be performed, and instructs the individual components to perform the operations.

Here, examples will be described with respect to the determination of the content of the preliminary charging operation based on FIGS. 9 to 11.

First Example

In a first example, a preceding image forming operation is terminated at 10:00 on May 15, and an instruction for executing a current image forming operation is issued at 12:00 on May 16 (the next day), which is 26 hours later. Furthermore, a temperature detected by the temperature detector 183 at 12:00 at which the execution instruction of the image forming operation is issued is 27° C., and the number of rotations of the photosensitive drum 13 during a period of 24 hours before the end of the preceding image forming operation is 3000 times.

In the first example, a coefficient by which the reference time of the entire preliminary charging operation is multiplied is "1" as illustrated in FIG. 9, a period of time for the idling operation (time point t6 to time point t7) is 0 second as illustrated in FIG. 10, and a coefficient by which the reference time of the entire preliminary charging operation is multiplied is "1" as illustrated in FIG. 11. Therefore, the period of time of the entire preliminary charging operation (time point t1 to time point t5) is 1 second, the period of time from the time point t1 to the time point t2 is 0.91 seconds, and the idling operation is not executed.

Second Example

In a second example, the preceding image forming operation is ended at 14:00 on May 16, and 73 hours later, at 15:00 on May 19 of the same year, an instruction for executing the current image forming operation is issued. Furthermore, a temperature detected by the temperature detector 183 at 15:00 at which the execution instruction of the image forming operation is issued is 30° C., and the number of rotations of the photosensitive drum 13 during a period of 24 hours before the end of the preceding image forming operation is 1000 times.

In the second example, a coefficient by which the reference time of the entire preliminary charging operation is multiplied is "3" as illustrated in FIG. 9, a period of time for the idling operation (time point t6 to time point t7) is 0.3 seconds as illustrated in FIG. 10, and a coefficient by which the reference time of the entire preliminary charging operation is multiplied is "1" as illustrated in FIG. 11. Therefore, the period of time for the entire preliminary charging operation (time point t1 to time point t5) is 3 seconds, the period of time from the time point t1 to the time point t2 is 2.91 seconds, and a period of time for the idling operation (time point t6 to time point t7) is 0.3 seconds.

Third Example

In a third example, a preceding image forming operation is terminated at 10:00 on May 15, and 26 hours later, at 12:00 on May 16 of the same year, an instruction for executing a current image forming operation is issued. Furthermore, a temperature detected by the temperature detector 183 at 12:00 at which the execution instruction of the image forming operation is issued is 27° C., and the number of rotations of the photosensitive drum 13 during a period of 24 hours before the end of the preceding image forming operation is 40 times.

In the third example, a coefficient by which the reference time of the entire preliminary charging operation is multiplied is "1" as illustrated in FIG. 9, a period of time for the idling operation (time point t6 to time point t7) is 0 second as illustrated in FIG. 10, and a coefficient by which the reference time of the entire preliminary charging operation is multiplied is "0.5" as illustrated in FIG. 11. Therefore, the period of time of the entire preliminary charging operation (time point t1 to time point t5) is 0.5 seconds, the period of time from the time point t1 to the time point t2 is 0.41 seconds, and the idling operation is not executed.

Fourth Example

In a fourth example, a preceding image forming operation is terminated at 14:00 on May 16, and 73 hours later, at 15:00 on May 19, an instruction for executing a current image forming operation is issued. Furthermore, a temperature detected by the temperature detector 183 at 15:00 at which the execution instruction of the image forming operation is issued is 30° C., and the number of rotations of the photosensitive drum 13 during a period of 24 hours before the end of the preceding image forming operation is 4000 times.

In the fourth example, a coefficient by which the reference time of the entire preliminary charging operation is multiplied is "3" as illustrated in FIG. 9, a period of time for the idling operation (time point t6 to time point t7) is 0.3 seconds as illustrated in FIG. 10, and a coefficient by which the reference time of the entire preliminary charging operation is multiplied is "1.2" as illustrated in FIG. 11. Therefore, the period of time for the entire preliminary charging operation (time point t1 to time point t5) is 3.6 seconds (=3×1.2), the period of time from the time point t1 to the time point t2 is 3.51 seconds, and a period of time for the idling operation (time point t6 to time point t7) is 0.3 seconds.

Next, an example of an operation of controlling the preliminary charging operation in the image-forming apparatus 100 will be described with reference to the drawings. FIG. 12 is a flowchart illustrating an example of an operation of controlling the preliminary charging operation performed by the image-forming apparatus 100 according to the embodiment of the present disclosure.

In the image-forming apparatus 100, the processor 181 determines whether an image forming operation execution instruction, such as an operation by an operator, has been issued (step S11). When it is determined that the image forming operation execution instruction has not been issued and the image forming operation is not to be executed (step S11: NO), the process returns to step S11. When it is determined that the image forming operation execution instruction has been issued and the image forming operation is to be executed (step S11: YES), the processor 181 determines whether the preliminary charging operation is to be executed, a configuration of the preliminary charging operation, whether the idling operation is to be executed, and whether other operations relating to the preliminary charging operation are to be executed based on data (including data stored in the storage 185) supplied from the temperature detector 183, the rotation detector 184, the image former 4, and the like (step S12). The processor 181 transmits an instruction to the photosensitive drum 13 and the charging roller 15 so that the preliminary charging operation of the determined contents and the operations relating thereto are executed, and the operation is terminated. As a result, the preferable preliminary charging operation (idling operation) is executed before the image forming operation, and deterioration of quality of an image formed on the recording sheet P can be suppressed.

The image-forming apparatus 100 according to the embodiment has been described hereinabove. As described above, the image-forming apparatus 100 performs the image forming operation after performing the preliminary charging operation when a predetermined condition is satisfied at a time of execution of the image forming operation. In the preliminary charging operation, in a state in which a DC voltage is applied to the charging roller 15, the pre-rotation contact portion 13*a* of the photosensitive drum 13 positioned in the nip region NT when the image forming operation is performed is moved to the discharge regions CF and CR positioned at both ends of the nip region NT, thereby eliminating the non-uniformity of the charging on the photosensitive drum 13. As a result, the non-uniformity of the charging on the photosensitive drum 13 can be promptly eliminated, and deterioration in quality of an image formed on the recording sheet P can be suppressed. Furthermore, since the preliminary charging operation is completed in a relatively short period of time, work efficiency of the image-forming apparatus 100 is not deteriorated.

Moreover, as described above, the image-forming apparatus 100 includes at least one of the timer 182 that measures an elapsed time from the end of the preceding image forming operation, the temperature detector 183 that detects a temperature, and the rotation detector 184 that measures the number of rotations of the photosensitive drum 13 in a period a predetermined period of time before the end of the preceding image forming operation, and determines the execution and duration of the preliminary charging operation according to a value output from at least one of the timer 182, the temperature detector 183, and the rotation detector 184. Specifically, a determination as to whether the preliminary charging operation is to be executed, a determination of content of the preliminary charging operation, a determination of an execution time of the idling operation after the preliminary charging operation, and the like are made based on an elapsed time from the execution of the preceding image forming operation, the ambient temperature of the image-forming apparatus 100, the number of rotations of the photosensitive drum 13 during 24 hours before the end of the preceding image forming operation, and the like. Therefore, a more preferable preliminary charging operation or the like based on the history of the photosensitive drum 13, and deterioration in image quality can be efficiently suppressed.

Moreover, the image-forming apparatus 100 may include at least one of the timer 182 that measures an elapsed time from an end of a preceding image forming operation, the temperature detector 183 that detects a temperature, and the rotation detector 184 that measures the number of rotations of the photosensitive drum 13 in a period a predetermined period of time before an end of the preceding image forming operation, determine the execution and duration of the preliminary charging operation according to a value output from at least one of the timer 182, the temperature detector 183, and the rotation detector 184, and execute the image quality adjustment operation after the preliminary charging operation is executed.

In addition, the present disclosure is not limited to the above-described embodiments, and may be in other forms. Although, for example, a determination as to whether the preliminary charging operation is to be executed, a determination of content of the preliminary charging operation, a determination of an execution time of the idling operation after the preliminary charging operation, and the like may be made based on the ambient temperature of the image-forming apparatus 100, the number of rotations of the photosensitive drum 13 within 24 hours before the end of the preceding image forming operation, and the like, the determinations may be made by other factors. For example, the determinations may be made based on the ambient temperature when the preceding image forming operation is executed, instead of the ambient temperature when the image forming operation is executed. Furthermore, since the charging characteristic changes according to a degree of wear of the photosensitive drum 13, the content of the preliminary charging operation and the like may be determined based on the degree of wear of the photosensitive drum 13. In this case, the total number of rotations of the photosensitive drum 13 or the like may be used as a reference.

Furthermore, the values illustrated in FIGS. 9, 10, and 11 may be changed to preferable values depending on a use environment, performance of the image-forming apparatus 100, and the like.

The present disclosure is not limited to the embodiment described above, but can be executed in various other forms. Thus, the embodiment is simply exemplification in all the aspects and should not be considered to be limiting. The scope of the present disclosure is indicated by the appended claims and is not bound in any way by the text of the specification. Furthermore, all variations and modifications that fall within the equivalent range of the scope of the claims fall within the scope of the present disclosure.

What is claimed is:

1. An image-forming apparatus comprising:

an image carrier on which a toner image is formed; and a charging roller that is brought into contact with a surface of the image carrier to charge the surface of the image carrier, wherein the image carrier is rotatable in both a forward rotation direction and a reverse rotation direction which are rotation directions in image formation, and the charging roller is rotatable in accordance with a rotation of the image carrier, a preliminary charging operation is performed which is an operation of applying a direct current (DC) voltage to the charging roller and then rotating the image carrier in at least one of the forward rotation direction and the reverse rotation direction so that a pre-rotation contact portion that is in contact with the charging roller before the rotation on the surface of the image carrier is charged when being moved to discharge regions on the charging roller, and the discharge regions are adjacent spaces which are located adjacent to a nip region, in which the charging roller is in contact with the image carrier, in the forward rotation direction and the reverse rotation direction, and have a gap between the charging roller and the image carrier within a predetermined distance.

2. The image-forming apparatus according to claim 1, further comprising a temperature detector that detects environmental information around the image-forming apparatus, wherein when a predetermined period of time has elapsed since a preceding image forming operation and detected environmental information satisfies a predetermined environmental condition at a time of acceptance of an execution of an image forming operation, the preliminary charging operation is performed before the accepted image forming operation is performed, and in the preliminary charging operation, in a state in which the DC voltage is applied to the charging roller, the image carrier is rotated in the reverse rotation direction to move the pre-rotation contact portion into the discharge regions, and thereafter, rotated in the forward rotation direction, before the rotation and the application of the DC voltage are stopped.

3. The image-forming apparatus according to claim 2, wherein in the preliminary charging operation, a rotation angle of the image carrier in the forward rotation direction after the rotation in the reverse rotation direction is larger than a rotation angle of the image carrier in the reverse rotation direction.

4. The image-forming apparatus according to claim 1, wherein an image quality adjustment operation is started to attain a predetermined image quality after the preliminary charging operation is terminated, and the image forming operation is started after the image quality adjustment operation is terminated.

5. The image-forming apparatus according to claim 1, wherein a rotation speed at which the image carrier is rotated in the forward rotation direction and the reverse rotation direction in the preliminary charging operation is lower than a rotation speed at which the image carrier is rotated in the image forming operation.

6. The image-forming apparatus according to claim 1, further comprising:

at least one of a timer that measures an elapsed time from an end of a preceding image forming operation, a temperature detector that detects a temperature, and a rotation detector that measures a number of rotations of the image carrier in a predetermined period of time before an end of the preceding image forming operation, wherein an execution and a duration of the preliminary charging operation are determined in accordance with a value output from at least one of the timer, the temperature detector, and the rotation detector.

7. The image-forming apparatus according to claim 4, further comprising:

at least one of a timer that measures an elapsed time from an end of a preceding image forming operation, a temperature detector that detects a temperature, and a rotation detector that measures a number of rotations of the image carrier in a predetermined period of time before an end of the preceding image forming operation, wherein an execution and a duration of the preliminary charging operation are determined in accordance with a value output from at least one of the timer, the temperature detector, and the rotation detector.

* * * * *